(12) United States Patent
Sridhar et al.

(10) Patent No.: US 9,139,307 B2
(45) Date of Patent: Sep. 22, 2015

(54) AIRCRAFT SYSTEMS AND METHODS FOR DISPLAYING RUNWAY LIGHTING INFORMATION

(71) Applicant: HONEYWELL INTERNATIONAL INC., Morristown, NJ (US)

(72) Inventors: Vijaya Sridhar, Bangalore (IN); Dave Pepitone, Sun City West, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 165 days.

(21) Appl. No.: 13/931,224

(22) Filed: Jun. 28, 2013

(65) Prior Publication Data

US 2015/0002316 A1    Jan. 1, 2015

(51) Int. Cl.
| | |
|---|---|
| *B64F 1/18* | (2006.01) |
| *B64D 43/00* | (2006.01) |
| *B64D 43/02* | (2006.01) |
| *B64D 45/04* | (2006.01) |
| *G08G 5/00* | (2006.01) |
| *G08G 5/02* | (2006.01) |
| *G08G 5/06* | (2006.01) |
| *G01C 23/00* | (2006.01) |

(52) U.S. Cl.
CPC ............... *B64D 43/00* (2013.01); *B64D 43/02* (2013.01); *B64D 45/04* (2013.01); *G08G 5/0013* (2013.01); *G08G 5/0021* (2013.01); *G08G 5/025* (2013.01); *G08G 5/065* (2013.01); *G01C 23/005* (2013.01)

(58) Field of Classification Search
CPC ...................................................... B64D 43/00
USPC ......................................................... 340/953
See application file for complete search history.

(56) References Cited

U.S. PATENT DOCUMENTS

| | | | |
|---|---|---|---|
| 4,040,005 A | | 8/1977 | Melvin |
| 4,210,930 A | * | 7/1980 | Henry ........................... 348/117 |
| 4,368,517 A | | 1/1983 | Lovering |
| 4,599,070 A | * | 7/1986 | Hladky et al. ................... 434/45 |
| 5,289,185 A | | 2/1994 | Ramier et al. |
| 5,566,073 A | | 10/1996 | Margolin |
| 5,684,496 A | | 11/1997 | Parus |
| 5,745,054 A | | 4/1998 | Wilkens |
| 5,798,713 A | | 8/1998 | Viebahn et al. |

(Continued)

FOREIGN PATENT DOCUMENTS

| | | |
|---|---|---|
| EP | 1950532 A2 | 7/2008 |
| EP | 2182326 A1 | 5/2010 |

(Continued)

OTHER PUBLICATIONS

USPTO Office Action for U.S. Appl. No. 13/033,369; Notification date May 14, 2014.

(Continued)

*Primary Examiner* — Kerri McNally
(74) *Attorney, Agent, or Firm* — Ingrassia Fisher & Lorenz, P.C.

(57) ABSTRACT

A display system for an aircraft includes a processing unit configured to determine runway lighting information and lighting status for runway lighting associated with a selected runway and to generate display commands based on the runway lighting information and the lighting status; and a display device coupled the processing unit and configured to receive the display commands and to display symbology representing the runway lighting information.

20 Claims, 5 Drawing Sheets

(56) References Cited

U.S. PATENT DOCUMENTS

| | | | |
|---|---|---|---|
| 6,111,526 A | 8/2000 | Aymeric et al. | |
| 6,121,899 A | 9/2000 | Therialut | |
| 6,157,876 A | 12/2000 | Tarleton et al. | |
| 6,199,008 B1 | 3/2001 | Aratow et al. | |
| 6,320,579 B1 | 11/2001 | Snyder et al. | |
| 6,486,799 B1 | 11/2002 | Still et al. | |
| 6,903,752 B2 | 6/2005 | Ebersole et al. | |
| 7,089,092 B1 | 8/2006 | Wood et al. | |
| 7,196,329 B1 | 3/2007 | Wood et al. | |
| 7,209,053 B2 | 4/2007 | Gannon | |
| 7,216,069 B2 | 5/2007 | Hett | |
| 7,295,901 B1 | 11/2007 | Little et al. | |
| 7,382,288 B1 | 6/2008 | Wilson et al. | |
| 7,603,209 B2 | 10/2009 | Dwyer et al. | |
| 7,619,626 B2 | 11/2009 | Bernier | |
| 7,679,528 B1 * | 3/2010 | Etherington et al. | 340/945 |
| 7,705,879 B2 | 4/2010 | Kerr et al. | |
| 7,796,055 B2 | 9/2010 | Clark et al. | |
| 7,813,845 B2 | 10/2010 | Doose et al. | |
| 7,852,236 B2 | 12/2010 | Feyereisen et al. | |
| 7,974,773 B1 | 7/2011 | Krenz et al. | |
| 7,986,249 B2 | 7/2011 | Wilson et al. | |
| 8,032,267 B1 | 10/2011 | Simon | |
| 8,060,262 B2 | 11/2011 | Burgin et al. | |
| 8,095,249 B2 | 1/2012 | Little et al. | |
| 8,116,975 B2 | 2/2012 | Stavaeus et al. | |
| 8,125,352 B2 | 2/2012 | Dubourg et al. | |
| 8,160,758 B2 | 4/2012 | Call et al. | |
| 8,374,737 B2 | 2/2013 | Takacs et al. | |
| 2002/0099528 A1 * | 7/2002 | Hett | 703/13 |
| 2004/0015274 A1 | 1/2004 | Wilkins et al. | |
| 2004/0044446 A1 | 3/2004 | Staggs | |
| 2005/0007386 A1 | 1/2005 | Berson et al. | |
| 2005/0161603 A1 | 7/2005 | Kerr | |
| 2006/0195235 A1 | 8/2006 | Ishihara et al. | |
| 2006/0200279 A1 | 9/2006 | Ainsworth et al. | |
| 2006/0241820 A1 | 10/2006 | Dwyer et al. | |
| 2007/0002078 A1 | 1/2007 | He et al. | |
| 2007/0075244 A1 | 4/2007 | Kerr | |
| 2007/0115141 A1 | 5/2007 | Kaminski et al. | |
| 2008/0027596 A1 | 1/2008 | Conner et al. | |
| 2008/0252489 A1 | 10/2008 | Naimer et al. | |
| 2009/0207048 A1 | 8/2009 | He et al. | |
| 2009/0293012 A1 | 11/2009 | Alter et al. | |
| 2010/0026525 A1 | 2/2010 | Feyereisen et al. | |
| 2010/0036552 A1 | 2/2010 | Pepitone et al. | |
| 2010/0039295 A1 | 2/2010 | Dubourg et al. | |
| 2010/0207026 A1 | 8/2010 | Kerr | |
| 2010/0287500 A1 | 11/2010 | Whitlow et al. | |
| 2010/0295706 A1 | 11/2010 | Mathan et al. | |
| 2011/0106343 A1 * | 5/2011 | Burgin et al. | 701/16 |
| 2011/0196598 A1 | 8/2011 | Feyereisen et al. | |
| 2011/0246003 A1 | 10/2011 | Lafon et al. | |
| 2011/0304479 A1 | 12/2011 | Chen et al. | |
| 2012/0026190 A1 | 2/2012 | He et al. | |

FOREIGN PATENT DOCUMENTS

| | | |
|---|---|---|
| EP | 2221583 A2 | 8/2010 |
| EP | 2234088 A2 | 9/2010 |
| EP | 2244239 A2 | 10/2010 |
| EP | 2317488 A2 | 5/2011 |
| EP | 2560152 A1 | 2/2013 |

OTHER PUBLICATIONS

Pepitone D., et al.; Aircraft Systems and Methods for Displaying Visual Segment Information, U.S. Appl. No. 13/033,369, filed Feb. 23, 2011.

EP Search Report, EP 12156601.2-1803 dated Feb. 13, 2022.

EP Office Action, EP 12 156 601.2 dated May 23, 2013.

Pepitone D., et al.; Aircraft Systems and Methods for Displaying Visual Segment Information, U.S. Appl. No. 13/033,369, USPTO Office Action, Notification Date May 7, 2012.

Pepitone D., et al.; Aircraft Systems and Methods for Displaying Visual Segment Information, U.S. Appl. No. 13/033,369, USPTO Office Action, Notification Date Dec. 7, 2012.

Pepitone D., et al.; Aircraft Systems and Methods for Displaying Visual Segment Information, U.S. Appl. No. 13/033,369, USPTO Office Action, Notification Date May 16, 2013.

USPTO Office Action for U.S. Appl. No. 13/033,369; Notification date Nov. 14, 2014.

EP Extended Search Report for 14172633.1-1760/2837565 dated Apr. 20, 2015.

* cited by examiner

AIRCRAFT SYSTEMS AND METHODS FOR DISPLAYING RUNWAY LIGHTING INFORMATION

TECHNICAL FIELD

The present invention generally relates to aircraft systems and methods, and more particularly, to aircraft systems and methods for displaying runway lighting information.

BACKGROUND

Landing is one of the most demanding tasks in flying. During the landing approach, the pilot must evaluate if the aircraft may safely land or if the landing attempt should be aborted. In addition to monitoring various flight instruments and navigating the aircraft, Federal Aviation Administration (FAA) regulations require a pilot to visibly identify certain runway environment or runway surface or lighting references in a predefined visual segment in front of the aircraft. Generally, the visual segment is defined by the FAA by the ability to visually identify ground references at a certain distance and aircraft flight deck angle and altitude and under certain visibility conditions.

Portions of the visual segment typically include various types of runway (or airport) lighting systems, such as the lighting associated with approach lights, threshold lights, and touchdown zone lights. As such, at a predetermined approach point (e.g., a decision height), the pilot is required to look out of the window and identify required airport lighting references. Upon positive identification, the pilot may continue the approach and land the aircraft. The time allocated to this task is very limited given the airspeed of the aircraft and the typical or nominal reaction time of the pilot to see and recognize such references at the decision height. Estimating the visual segment and identifying the airport lighting references may be a challenge given the various types of airport lighting and flight circumstances, particularly at all angles of approach and in nighttime, low visibility, turbulent or crosswind situations that may make it difficult for the pilot to quickly locate and identify the references.

Computer generated aircraft displays have become highly sophisticated and capable of displaying a substantial amount of flight management, navigation, and control information that gives flight crews more effective control of the aircraft and a reduction in workload during a normal flight situation and/or a low visibility, instrument situation. In this regard, electronic displays, such as head up displays (HUDs) and head down displays (HDDs), are used in aircraft as primary flight displays. For example, the primary flight display can combine critical flight instrumentation (e.g., altitude, attitude, heading, airspeed, vertical speed instruments) and primary engine instrument indicators into a single, readily interpretable display. Although conventional primary flight displays may provide some assistance to the pilot during normal and instrument situations, such displays are typically not as helpful during landing situations, particularly in tasks such as anticipating and identifying airport lighting information.

Accordingly, it is desirable to provide systems and methods that improve situational awareness and assist the pilot in identifying and interpreting airport lighting information during a landing situation. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a display system for an aircraft includes a processing unit configured to determine runway lighting information and lighting status for runway lighting associated with a selected runway and to generate display commands based on the runway lighting information and the lighting status; and a display device coupled the processing unit and configured to receive the display commands and to display symbology representing the runway lighting information.

In accordance with another exemplary embodiment, a method is provided of displaying symbology during a landing operation of an aircraft onto a runway. The method includes presenting a synthetic view of a runway environment; determining runway lighting information associated with the runway; and displaying the runway lighting information on the synthetic view of the runway environment.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
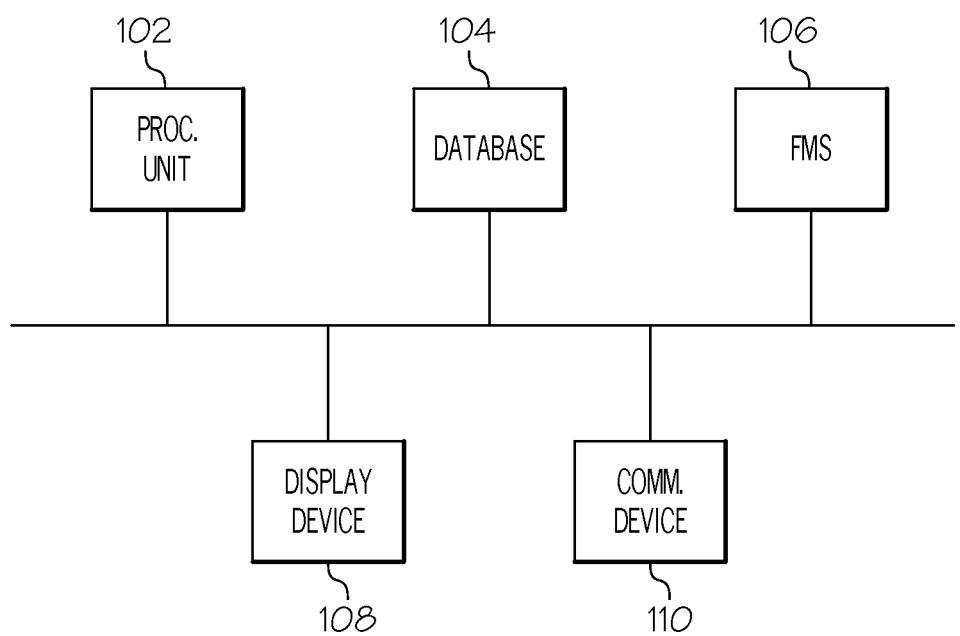
FIG. 1 is a functional block diagram of a system for displaying runway lighting information in accordance with an exemplary embodiment.

Broadly, exemplary embodiments described herein provide visual display systems and methods for aircraft. FIG. 1 depicts a block diagram of an exemplary aircraft visual display system 100 for displaying runway lighting information to the pilot of an aircraft. In general, "runway lighting" may refer to lighting associated with, for example, an approach lighting system (ALS), threshold lighting, touchdown lighting, and the like. Additional details about the display are provided below after a brief introduction of the components of the system 100.

In the exemplary embodiment shown, the system 100 includes a processing unit 102, a database 104, a flight management system 106, a display device 108, and a communications device 110. Although the system 100 appears in FIG. 1 to be arranged as a single system on a data communications bus or systems bus, the system 100 is not so limited and may also include an arrangement whereby one or more of the processing unit 102, the database 104, the flight management system 106, the display device 108, and the communications device 110 are separate components or subcomponents of another system located either onboard or external to an aircraft. Also, for example, the system 100 may be arranged as an integrated system (e.g., aircraft display system, primary flight display system, a head up display with Synthetic Vision Systems (SVS) or Enhanced Vision System (EVS) as an overlay, a "near to eye display" system, or a head mounted display system, etc.) or a subsystem of a more comprehensive aircraft system (e.g., flight management system, navigation and control system, target aiming and control system, collision alert and/or avoidance system, weather avoidance system, etc.). The system 100 may be utilized in an aircraft, such as a helicopter, airplane, or unmanned vehicle. Moreover, equivalent embodiments of the system 100 may also be utilized in spacecraft, ships, submarines, and other types of vehicles. For simplicity, embodiments are described below with reference to "aircraft."

The processing unit 102 may be a computer processor associated with a primary flight display. Generally, the processing unit 102 receives and/or retrieves flight management information (e.g., from the flight management system 106) and landing, target and/or terrain information (e.g., from database 104). As discussed in greater detail below, the processing unit 102 may particularly receive data representing runway lighting information, including the type, position, composition, color, pattern, arrangement, illumination, timing, operational status and the like from database 104, flight management system 106, and/or communications device 110. The processing unit 102 may function as a graphics display generator to generate display commands based on algorithms or other machine instructions stored in the processing unit 102 or in separate memory components. As examples, the display commands may represent navigation and control information such as a zero pitch reference line, heading indicators, tapes for airspeed and altitude, terrain information, flight path information, required navigation performance (RNP) information, and any other information desired by a flight crew. As introduced above and discussed in further detail below, the processing unit 102 additionally calculates and generates display commands representing runway lighting information (also referenced as airport lighting information). The processing unit 102 then sends the generated display commands to a display device (e.g., the display device 108). In one exemplary embodiment, the processing unit 102 may include a communications management unit (CMU), as is described in greater detail below. More specific functions of the processing unit 102 will also be discussed below.

In one exemplary embodiment, processing unit 102 is configured to receive inputs from a user via a user interface. Examples of user interfaces that are compatible with system 100 include, but are not limited to, a mouse, a track ball, a joy stick, a key board, a touch pad, a touch screen, a microphone, a camera, and a motion sensor. In some embodiments, the user interface may be incorporated into display device 108.

Database 104 is coupled to processing unit 102 and may be a memory device (e.g., non-volatile memory, disk, drive, tape, optical storage device, mass storage device, etc.) that stores digital landing, waypoint, and target location as either absolute coordinate data or as a function of an aircraft's position. Database 104 can also include, for example, a terrain database, which includes the locations and elevations of natural and manmade terrain. Database 104 can additionally include other types of navigation information relating to the calculation of the visual segment and runway lighting information. Runway and/or taxiway data may be obtained from airports, Runway Awareness and Advisory System (RAAS), and airport mapping database (AMDB). The runway data may include, for example, the length, altitude and gradient of the intended landing runway. The runway data may also include a map of the airport, which includes data defining the runways at the airport, including the runway identifications, runway markings, and other references. The runway data can be used to compare aircraft position with various aspects of the runway environment to subsequently generate a synthetic view of the runway environment relative to the aircraft, as discussed below. In particular, as introduced above, the data in the database 104 may include information about the airport lighting for each runway, including lighting name and type, availability, status, and visual characteristics. As such, the database 104 may include or be considered a chart database which may include information such as approach minimums and minimums based on out of service components such as runway lighting. Data in the database 104 may be uploaded prior to flight or received from external sources, such as an airport transmitter or onboard sensors.

Database 104 may further include aircraft data obtained from the Federal Aviation Administration (FAA) and aircraft manufacturers, such as from aircraft flight manual. The aircraft data may also include aircraft characteristics as a function of, for example, aircraft weight, with corrections based on, for example, wind direction, runway slope, runway surface condition, atmospheric altitude and outside temperature. The aircraft data may also include a list of manufacturer or company regulations defining various aspects of flight, particularly landing. As also discussed below, the aircraft data may further include information such as nose geometry, pilot seated position, pilot eye reference point and windshield configuration.

The flight management system 106 is coupled to processing unit 102 and may provide navigation data associated with the aircraft's current position and flight direction (e.g., heading, course, track, etc.) to the processing unit 102. The navigation data provided to the processing unit 102 may also include information about the aircraft's airspeed, altitude, pitch, glide scope, and other important flight information. In exemplary embodiments, the flight management system 106 may include any suitable position and direction determination devices that are capable of providing the processing unit 102 with at least an aircraft's current position, the real-time direction in terms of heading, track, or both for the aircraft in its flight path, the waypoints along the flight path, and other important flight information. Information may be provided to the processing unit 102 by, for example, an Inertial Reference System (IRS), Air-data Heading Reference System (AHRS), and/or a global positioning system (GPS).

The system 100 also includes the display device 108 coupled to the processing unit 102. The display device 108 may include any device or apparatus suitable for displaying various types of computer generated symbols and flight information discussed above. Using data retrieved (or received) from the flight management system 106, database 104, or communications device 110, the processing unit 102 executes one or more algorithms (e.g., implemented in software) for determining the position of the various types of desired information on the display device 108. As noted above, the processing unit 102 then generates display commands representing this data, and sends display commands to the display device 108.

In this embodiment, the display device 108 is an aircraft primary flight display. However, any suitable type of display medium capable of visually presenting multi-colored or monochrome flight information for a pilot or other flight crew member may be provided, such as, for example, various CRT and flat-panel display systems (e.g., CRT displays, LCDs, OLED displays, plasma displays, projection displays, HDDs, HUDs, etc.). In some exemplary embodiments, the display device 108 may include flexible OLEDs and/or 3D displays.

In one exemplary embodiment, the communications device 110 may be any suitable device for sending and receiving information to and from the aircraft system 100. In some embodiments, communications device 110 may be configured to receive radio frequency transmissions, satellite communication transmissions, optical transmissions, laser light transmissions, sonic transmissions or transmissions of any other wireless form of communication. The communications device 110 may provide information to or from any of the components of the system 100.

In one exemplary embodiment, and as discussed in greater detail below, the communications device 110 may receive airport messages. As used herein, the term "airport message" refers to information relating to an airport, a runway and/or an aircraft approaching the airport or the runway. Airport messages may be sent by data link transmitters located at each target airport. In other embodiments, the airport messages may be sent from locations other than the airport. For example, an airport message may include information indicating that either an airport or runway is closed. In another example, an airport message may comprise information indicating that a portion of the runway lighting aid is inoperative. Airport messages may be, for example, "Notice to Airmen" messages (NOTAM or NoTAM). In general, a NOTAM is a notice filed with an aviation authority to alert aircraft pilots of potential hazards along a flight route or at a location that could affect the safety of the flight. As also discussed below, NOTAMs may provide indications about the service status of runway lighting. Other types of airport messages may include government, airline, or company-generated messages. When received, communications device 110 is configured to forward the airport message to processing unit 102. The processing unit 102 is configured to receive the airport message and to issue commands to the display device 108 to display information associated with the airport message, as discussed in greater detail below.

As described in greater detail below, the system 100 may provide information related to various types of airport or runway lighting systems. Any type of runway lighting system information may be provided. As an example, Approach Lighting Systems (ALSs) or Airport Lighting with Sequenced Flashing Lights (ALSF) Systems provide a directional pattern of high intensity signal lights that start at a landing threshold of the runway and that extend a prescribed distance into the approach area. These lighting systems are "lead in" lights with cross bars and "flashing rabbits" as cues to help the pilot orient the aircraft to the runway thresholds. The signal lights shine upwardly toward the aircraft along the approach slope or glide path and visually guide the pilot during the approach and landing. Other types of runway lighting may include lighting systems that assist with glide path. For example, a Precision Approach Path Indicator (PAPI) system that uses a single row of either two or four light units installed on either side of the runway to define the visual glide path angle. Each light unit has a white segment in an upper part of the beam and a red segment in a lower part of the beam, with the segments separated by a pink transition zone such that the pilot may evaluate the approach path based on the light color. A further example is a Visual Approach Slope Indicator (VASI) system in which two, four, six, twelve or sixteen lights arranged parallel to the runway centerline or as bars (commonly referred to as near, middle and far bars) to provide an indication of the visual guide paths. Other lighting systems may use a tri-color lighting technique or a pulsating light. Additionally types of runway lighting may include lighting on the runway itself, such as centerline lighting, runway edge lighting, and Runway End Identifier Lighting (REILs).

Accordingly, in one exemplary embodiment, the system 100 may operate as follows. To initiate operation of the system 100, a user (e.g., pilot or other aircraft controller) inputs information associated with a target airport, such as an identification of the target runway. The user may input the user information into system 100 prior to take off, during flight, prior to landing, or at any other suitable time. In other embodiments, the target runway may be received or retrieved from the flight plan generated with or stored in the flight management system 106. The processing unit 102 is configured (i.e., processing unit 102 is loaded with, and operates, appropriate software, algorithms and/or sub-routines) to receive information associated with target runway from database 104, including runway lighting data related to the target runway. As an example, the processing unit 102 may retrieve charts from database 104 containing, for example, airport lighting information and landing minimum information based on airport lighting status. The processing unit 102 is configured to evaluate the runway lighting based on the current position and flight scenario from the flight management system 106 and database 104 and send commands to display device 108. The runway lighting information is graphically displayed on the display device 108 (e.g., in 2D or 3D) and may include an accurate depiction of the runway lighting, a textual identification of the runway lighting, the distance or time remaining to the runway lighting, the status of the runway lighting, and other information, as will be discussed in greater detail below. As noted above, the processing unit 102 may additionally include a CMU that receives information from the communications device 110 of digital NOTAMs that relay status information regarding the runway lighting of the selected runway, and the CMU may function as an interface between the runway or airport chart information in the database 104 and the display device 108 such that the appropriate runway lighting information graphics may be displayed with the appropriate runway lighting status (e.g., in the form of an "X" on the depicted runway lighting, if appropriate, as discussed below) and with the appropriately modified landing minimums based on the NOTAMs. This information may be used by the pilot and/or other members of the flight crew during flight operations to enable, assist, or otherwise facilitate control of the aircraft.

Figure 2:
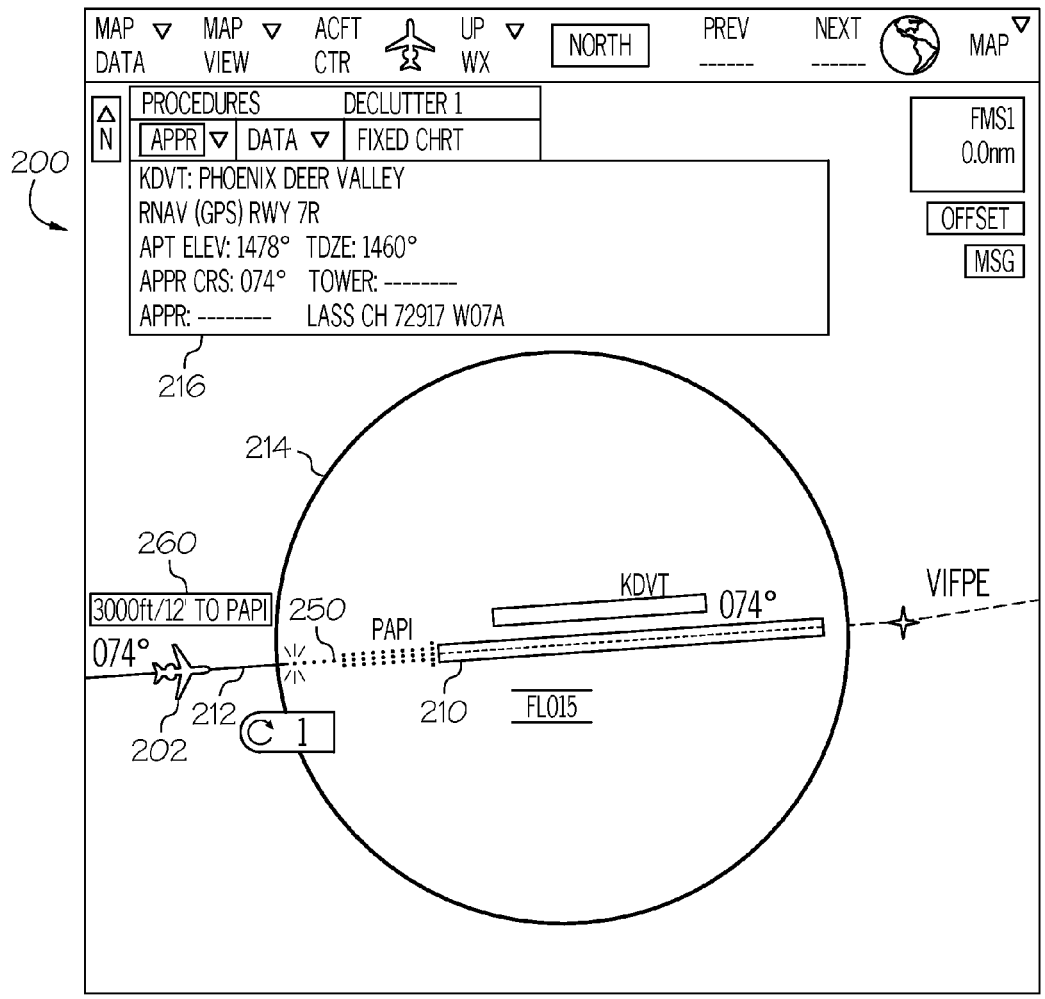
FIGS. 2-5 depict exemplary visual displays that may be rendered by the system of FIG. 1 in accordance with an exemplary embodiment.

FIG. 2 depicts an exemplary visual display 200 rendered on an aircraft display device. In one exemplary embodiment, the visual display 200 may be rendered by the system 100 of FIG. 1 on the display device 108. As such, FIGS. 1 and 2 are referenced in the discussion below.

FIG. 2 particularly depicts a moving map view of the aircraft at a distance from an airport. In general, the moving map view is a plan view of the aircraft, represented by symbology 202, relative to the surrounding environment. FIG. 2 additionally depicts symbology representing a target runway 210, a flight path 212, range ring 214, and navigation information 216. The runway 210 may be identified with alphanumeric characters, as shown. The navigation information 216 may include any suitable information about the aircraft, flight conditions and characteristics, airport, and runway 210. As such, in the exemplary scenario depicted by FIG. 2, the aircraft 202 is following flight path 212 towards approaching runway 210. As described above, the position and appearance of the symbology representing the flight path 212 and runway 210 may be generated by the processing unit 102 based on input from the database 104 and flight management system 106. Although not shown, other types of symbology may include waypoint symbols, weather information, terrain information, political boundaries, and navigation aids, such as the horizon line, flight path markers, airspeed, altitude, deviation, and the like.

FIG. 2 additionally depicts symbology representing runway lighting information, including runway lighting 250. In one exemplary embodiment, and as discussed in greater detail below, the runway lighting 250 is depicted in the visual display 200 as the airport lighting would appear to a viewer, e.g., the visual display 200 accurately depicts the orientation, arrangement, number, and color of lights associated with the target runway 210. The runway lighting 250 may include the visual characteristics of the lighting, as well as a textual indication of the type or name of the lighting. Additionally, the runway lighting 250 may accurately depict the dynamic lighting behavior of the corresponding lighting, such as flashing and sequencing. In the depicted embodiment of FIG. 2, the initial, single row of lights is depicted as flashing. Conventionally, airport charts or displays may only provide generic icons or indications of airport lighting. In other conventional systems, the pilot must refer to a chart comprising one or more pieces of paper that contain information about the target airport and/or the target runway to learn what type of airport lighting aid is available.

In the depicted embodiment, the visual display 200 accurately depicts the color, number, and arrangement of the runway lighting 250, which in this scenario is a PAPI-type lighting system. As noted above, other types of runway lighting 250 may be displayed, depending on the lighting associated with the target runway 210. Additionally, the visual display 200 may provide a lighting system identifier 252 to provide a textual indication of the type of lighting. As such, the identifier 252 in FIG. 2 is "PAPI".

In this exemplary embodiment, the aircraft 202 is at a predetermined distance or time period from the runway 210. At distances greater than this predetermined distance or time period, the runway lighting 250 is depicted with an exaggerated scale. In other words, the runway lighting 250 appears bigger than the runway lighting would otherwise appear from that distance and/or the runway lighting 250 is depicted with a greater scale than that of the runway 210 and surrounding environment. At the predetermined distance or time, the scale of the runway lighting 250 is adjusted to that of the runway 210, as discussed in greater detail below. In one exemplary embodiment, the predetermined distance may be, for example, 15 nm. In other exemplary embodiments, the predetermined distance may be the distance at which the runway lighting should be visible from the aircraft, which may be a function of conditions. Accordingly, the visual display 200 depicts the runway lighting 250 outside the predetermined distance in an accurate manner, albeit in a scale that may be viewed at that distance, and inside the predetermined distance in an accurate manner with a 1:1 scale.

In one exemplary embodiment, the system 100 may calculate the position and dimensions of the runway lighting based on a number of factors, including the shape of the aircraft, the elevation, and the pitch. These factors may be provided by the database 104 or the flight management system 106 (FIG. 1), and the airport lighting 250 may be constructed by the processing unit 102 (FIG. 1) for display in the visual display 200.

As noted above, the runway lighting 250 may form a portion of the visual segment. FAA regulation (e.g., FAR 91.189 or similar flight regulations, including company, state, local or foreign regulations) generally defines a visual segment in front of the aircraft 202 that the pilot should be able to view. The visual segment is typically a two dimensional area on the ground that may, for example, have a rectangular construction with a length and a width. The dimensions and construction of the visible segment may depend on a number of factors. At a certain point during the approach the pilot is generally required to visually identify the runway references, such as aspects of runway lighting 250, within the visual segment at or prior to the decision point of the landing approach. Such visual segments may be determined with any suitable algorithm in the processing unit 102 based on data from the database 104, flight management system 106, and/or communications device 110. For example, the visual segment may be determined by a number of factors, such as deck angle for a given approach speed, pilot's eye reference point, and aircraft nose geometry. When the pilots reach a predetermined point, the visual segment on the ground should contain enough identifiable lighting cues for the pilots to proceed with the approach. Even in ideal situations, it may be difficult to remove attention from cockpit instrumentation or displays, look out the window, orient a visual point of view relative to the runway and aircraft, estimate the position of the visual segment, and identify the runway lighting, if appropriate. This task may be more difficult in low visibility conditions or when the aircraft is some distance from the runway 210. As such, the system 100 provides a visual display 200 that enables the pilot to more easily identify the runway lighting 250. Although predefined visual segments are referenced, the runway lighting 250 displayed by the system 100 is not limited to the types of lighting systems associated with visual segments.

In addition to a visual representation of the runway lighting 250, other types of runway lighting information may be provided. In particularly, the visual display 200 further depicts symbology representing runway lighting distance 260. The runway lighting distance 260 is the current distance between the aircraft 202 and the beginning of the runway lighting system 250. In one exemplary embodiment, the runway lighting distance 260 is the distance between the current location of the aircraft 202 and the position at which the aircraft is in a position for the visual segment to be visible if the pilot's look out the windshield. In an alternate embodiment, the runway lighting distance 260 is the distance between the current location of the aircraft 202 and the position of the aircraft 202 at which the aircraft is over runway lighting system 250. From this information, the pilot may be able to anticipate when the runway lighting 250 is directly visible outside the window or windshield of the aircraft 202.

Similarly, the visual display 200 may further display runway lighting information representing runway lighting time remaining 262. The runway lighting time remaining 262 represents period of time between the current position of the aircraft 202 and when the runway lighting 250 should be visible. The runway lighting distance 260 and runway lighting time remaining 262 may be determined, for example, by annunciation logic in the processing unit 102 with consideration of the current and planned state of the aircraft 202. The runway lighting time remaining 262 may be displayed in addition to or in lieu of the airport lighting distance remaining 260.

Figure 3:
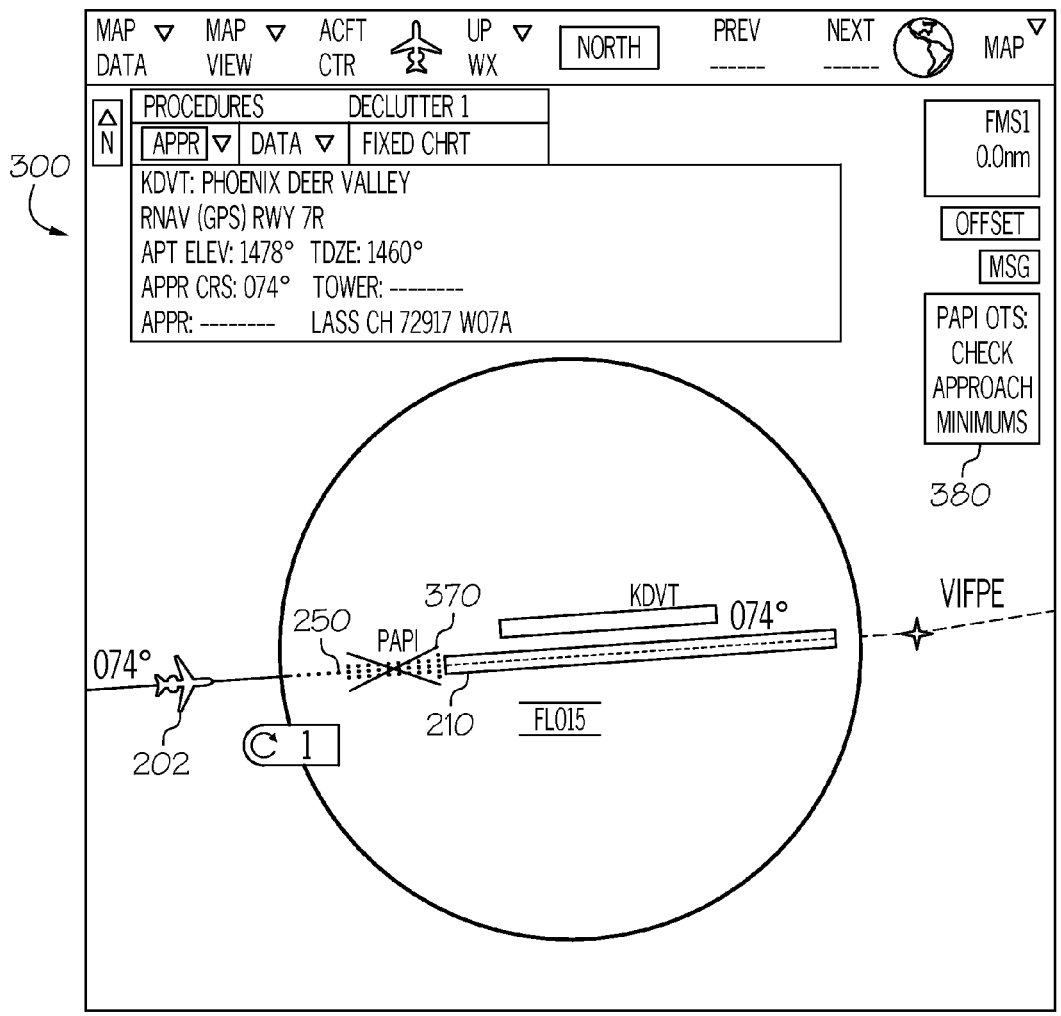

FIG. 3 depicts an exemplary visual display 300 rendered on an aircraft display device. In one exemplary embodiment, the visual display 300 may be rendered by the system 100 of FIG. 1 on the display device 108. As such, FIGS. 1 and 3 are referenced in the discussion below. FIG. 3 particularly depicts a moving map view of the aircraft at a distance from an airport. In general, the visual display 300 in FIG. 3 is similar to the visual display 200 depicted in FIG. 2, although FIG. 3 depicts a different scenario from that of FIG. 2.

As such, like FIG. 2, FIG. 3 depicts symbology representing the aircraft 202 and the runway 210. FIG. 3 additionally depicts symbology representing runway lighting 250, as discussed above. The visual display 300 additionally includes symbology representing runway lighting status 370. In this scenario, the runway lighting status 370 indicates that one or more of the airport lights are out of order. In one exemplary embodiment as shown, the runway lighting status 370 is an "X" positioned on the runway 210. Other symbols may be used. For instance, runway lighting status 370 may contain text explicitly stating the status of the runway lighting 250. The runway lighting status 370 may be determined, for example, from NOTAMs received via the communications device 110, discussed above. As such, the runway lighting status 370 indicates to the pilot that the runway lighting 250 may not appear as originally anticipated.

In a situation such as that depicted in FIG. 3, e.g., when the runway lighting 250 is out of order or otherwise unavailable, the approach minimums may be modified as compared to a typical situation. This information may be provided by the database 104 (e.g., from an instrument flight rules (IFR) chart) or flight management system 106 and calculated by the processing unit 102. As such, the visual display 300 may additionally highlight or otherwise provide the modified approach minimums, such as message 380.

Figure 4:
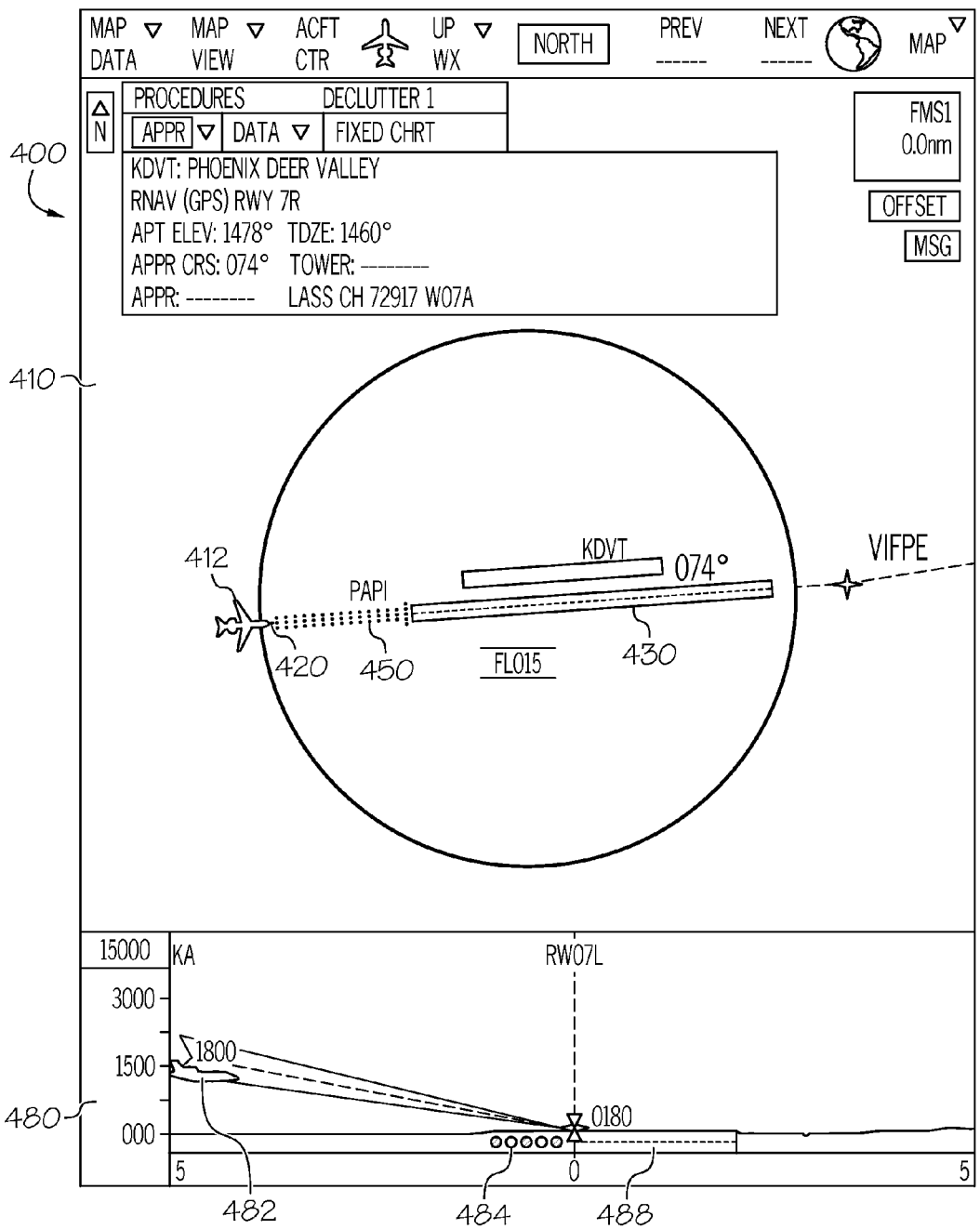

FIG. 4 depicts an exemplary visual display 400 rendered on an aircraft display device. In one exemplary embodiment, the visual display 400 may be rendered by the system 100 of FIG. 1 on the display device 108. As such, FIGS. 1 and 4 are referenced in the discussion below.

The visual display 400 includes at least a plan view 410 and an elevation view 480 displayed in different areas. Although FIG. 4 shows the plan view 410 and elevation view 480 displayed simultaneously, the views 410 and 480 may also be displayed individually. In general, the plan view 410 and elevation view 480 are multi-color, although one or more may be monochromatic or black and white.

The plan view 410, generally known as a lateral or moving map display, is a computer generated top-view of the aircraft, represented as an aircraft symbol 412, and the surrounding environment. In the view of FIG. 4, the plan view 410 includes symbology representing the flight path 420 of the aircraft 412 and the runway 430 during a landing situation. In general, the plan view 410 is analogous to the view of the visual display 200 of FIG. 2, except that the aircraft 412 is closer to the runway 430.

As above, the plan view 410 of the visual display 400 may also selectively render symbology representing the runway lighting 450. In general, the runway lighting 450 is arranged and positioned as described above in FIG. 2. However, as noted above in this scenario, the aircraft 402 is positioned within the predetermined distance or time from the airport 410. When the aircraft is positioned within the predetermined distance or time from the airport 410, the runway lighting 450 are represented by symbology having the same scale (e.g., in a 1:1 relative scale) as the airport 410. As such, the approach light 450 may automatically be resized when the runway lighting 450 is visible from the aircraft, for example, when the aircraft 402 reaches the predetermined distance. The airport lighting 450 is sized to represent the actual appearance of the airport lighting 450 relative to the surrounding environment such that the runway lighting 450 appears as the pilot may observe out of the window of the aircraft 402.

Accordingly, during a landing operation, a pilot may view the plan view 410 on the visual display 400 and immediately identify the appearance and position of the runway lighting 450 relative to the position of the aircraft 412. Based on this information, the pilot knows the appearance, type, and position of the runway lighting relative to the aircraft heading on the ground relative to the aircraft 412. This enables the pilot to perform the referencing task during a runway operation more quickly and accurately.

As introduced above, the visual display 400 further includes the elevation view 480. The elevation view 480 provides a two-dimensional view of the flight environment and may include one or more of the above-mentioned features that are displayed on the plan view 410. For example, the elevation view 480 includes an aircraft 482, symbology representing the runway lighting 484, and the runway 488. The elevation view 480 may further include a lateral indication 490 of the decision height at which the pilot is required to visually confirm the runway lighting 484 as part of the visual segment.

Figure 5:
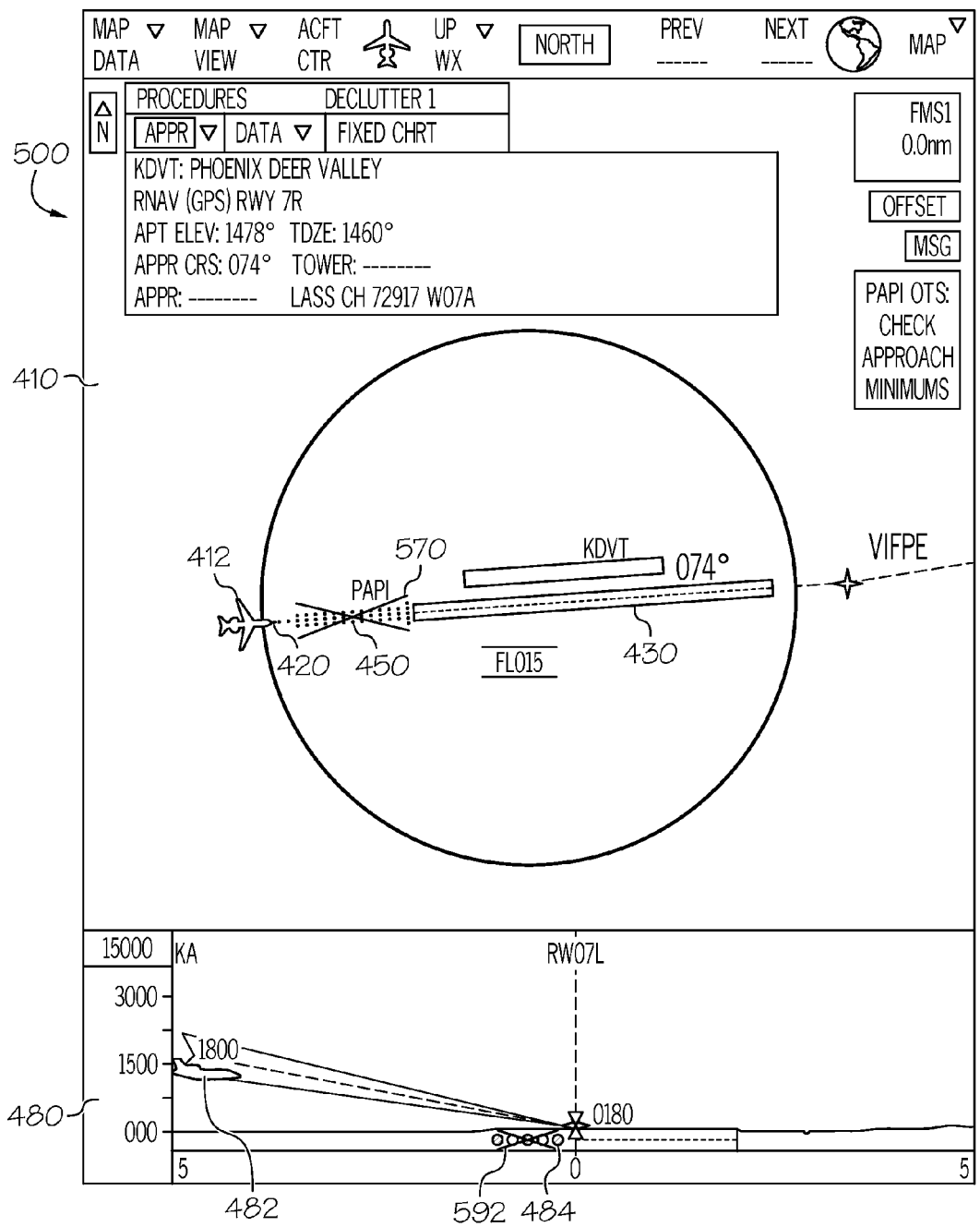

FIG. 5 depicts an exemplary visual display 500 rendered on an aircraft display device. In one exemplary embodiment, the visual display 500 may be rendered by the system 100 of FIG. 1 on the display device 108. As such, FIGS. 1 and 5 are referenced in the discussion below.

FIG. 5 particularly depicts a moving map view of the aircraft at a distance from an airport. In general, the visual display 500 in FIG. 5 is similar to the visual display 400 depicted in FIG. 4, although FIG. 5 depicts a different scenario from that of FIG. 4.

As such, like FIG. 4, FIG. 5 depicts a plan view 410 and an elevation view 480 displayed in different areas. The plan view 410 includes the aircraft symbol 412, flight path 420 of the aircraft, and the runway 430 during a landing situation. In addition, the plan view 410 of the visual display 500 may also selectively render symbology representing the runway lighting 450.

The visual display 500 additionally includes symbology representing runway lighting status 570. In this scenario, the runway lighting status 570 indicates that one or more of the airport lighting systems are out of order. This runway lighting status 570 may be determined, for example, from the NOTAMs system, discussed above. As such, the runway lighting status 570 indicates to the pilot that the runway lighting 450 may not appear as originally anticipated.

As introduced above, the visual display 500 further includes the elevation view 480 with the aircraft symbol 482, symbology representing the runway lighting 484, the plan view 410, the elevation view 480 includes symbology representing runway lighting status 592. In this embodiment, the runway lighting status 592 indicates that the runway lighting is out of order.

Accordingly, exemplary embodiments provide an accurate representation of the location of the runway lighting. This may increase situational awareness for the flight crew and increase flight safety by providing important information in an advantageously intuitive location and manner, which reduces pilot or operator workload and navigation errors, and thus results in increased aircraft and/or navigation safety.

Exemplary embodiments have been described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing Figures or the specification are not to be construed as limiting the order in which the individual processing steps may be performed. It should be appreciated that the particular implementations shown and described herein are illustrative of the invention and its best mode and are not intended to otherwise limit the scope of the invention in any way.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A display system for an aircraft, comprising:
    a processing unit configured to determine runway lighting information and lighting status for runway lighting associated with a selected runway and to generate display commands based on the runway lighting information and the lighting status; and
    a display device coupled to the processing unit and configured to receive the display commands and to display symbology representing the runway lighting information,
    wherein the processing unit is configured to determine at least one of a distance remaining or a time remaining between a current position of the aircraft and the runway lighting and to generate the display commands based on the at least one of the distance remaining or the time remaining, and wherein the display device is configured to display the at least one of the distance remaining or the time remaining.

2. The display system of claim 1, wherein the processing unit is further configured to determine a type of the runway lighting information, and wherein the display device is further configured to display symbology representing the type.

3. The display system of claim 1, wherein the display device is configured to display an aircraft symbol with the runway lighting information to indicate the relative positions of the aircraft and the runway lighting information.

4. The display system of claim 1, wherein the display device is configured to display the runway lighting information as a plan view.

5. The display system of claim 1, wherein the display device is configured to display the runway lighting information as an elevation view.

6. The display system of claim 1, wherein the runway lighting information includes at least one of approach lighting, runway threshold lighting, touchdown zone lighting, dynamic lighting.

7. The display system of claim 1, wherein the processing unit is configured to determine the distance remaining and to generate the display commands based on the distance remaining, and wherein the display device is configured to display the distance remaining.

8. The display system of claim 1, wherein the processing unit is configured to determine the time remaining and to generate the display commands based on the time remaining, and wherein the display device is configured to display the time remaining.

9. The display system of claim 1, wherein the display device is further configured to display symbology representing the selected runway.

10. The display system of claim 9,
    wherein the processing unit is configured to determine a distance remaining between a current position of the aircraft and the runway lighting,
    wherein the display device is configured to display the runway and the runway lighting information with a relative scale,
    wherein, when the distance remaining is greater than a predetermined distance, the display device is configured to display the runway lighting information with the relative scale greater than 1:1, and
    wherein, when the distance remaining is less than the predetermined distance, the display device is configured to display the airport lighting information with the relative scale approximately equal to 1:1.

11. The display system of claim 1, further comprising a communications device coupled to the processing unit and configured to receive an airport message, and wherein the processing unit is configured to generate the display commands based on the airport message.

12. The display system of claim 11, wherein display device is configured to display the lighting status associated with the runway based on the airport message.

13. The display system of claim 12, wherein, when the lighting status indicates that at least a portion of the runway lighting is unavailable, the display device is configured to display modified approach minimums.

14. A method of displaying symbology during a landing operation of an aircraft onto a runway, comprising the steps of:
    presenting a synthetic view of a runway environment;
    determining runway lighting information associated with the runway;
    displaying the runway lighting information on the synthetic view of the runway environment; and
    determining a distance remaining between a current position of the aircraft and the runway lighting, and
    wherein the displaying step includes displaying the runway and the runway lighting information with a relative scale,
        wherein, when the distance remaining is greater than a predetermined distance, the display device is configured to display the runway lighting information with the relative scale greater than 1:1, and
        wherein, when the distance remaining is less than the predetermined distance, the display device is configured to display the airport lighting information with the relative scale approximately equal to 1:1.

15. The method of claim 14, further comprising determining a type of the runway lighting information, and displaying symbology representing the type.

16. The method of claim 14, further comprising displaying the distance remaining.

17. The method of claim 14, further comprising determining a time remaining between a current position of the aircraft and the runway lighting, and displaying the time remaining.

18. The method of claim 14, further comprising receiving an airport message, and wherein the displaying includes displaying a lighting status associated with the runway based on the airport message.

19. A method of displaying symbology during a landing operation of an aircraft onto a runway, comprising the steps of:
- presenting a synthetic view of a runway environment;
- determining runway lighting information associated with the runway; and
- displaying the runway lighting information on the synthetic view of the runway environment,
- receiving an airport message, and wherein the displaying includes displaying a lighting status associated with the runway based on the airport message,
- wherein the displaying step includes displaying modified approach minimums when the lighting status indicates that at least a portion of the runway lighting is unavailable.

20. The method of claim 19, further comprising
- determining a distance remaining between a current position of the aircraft and the runway lighting, and
- wherein the displaying step includes displaying the runway and the runway lighting information with a relative scale,
  - wherein, when the distance remaining is greater than a predetermined distance, the display device is configured to display the runway lighting information with the relative scale greater than 1:1, and
  - wherein, when the distance remaining is less than the predetermined distance, the display device is configured to display the airport lighting information with the relative scale approximately equal to 1:1.

* * * * *